United States Patent [19]

Hitchcock et al.

[11] Patent Number: 4,464,343

[45] Date of Patent: Aug. 7, 1984

[54] PROCESS FOR ISOTOPE SEPARATION

[75] Inventors: William S. Hitchcock, St. James, Mo.; Joseph F. Stampfer, Jr., Santa Fe, N. Mex.

[73] Assignee: The Curators of the University of Missouri, Rolla, Mo.

[21] Appl. No.: 248,295

[22] Filed: Mar. 27, 1981

[51] Int. Cl.³ .................. B01D 59/00; B01D 59/50; B01D 59/02

[52] U.S. Cl. .................. 423/3; 210/704; 210/638

[58] Field of Search .................. 423/3; 210/704, 638

[56] References Cited

U.S. PATENT DOCUMENTS

| | | | |
|---|---|---|---|
| 3,965,250 | 6/1976 | DeWitt et al. | 423/539 |
| 4,086,163 | 4/1978 | Cahn et al. | 210/638 |
| 4,198,294 | 4/1980 | Deane | 210/704 |
| 4,198,297 | 4/1980 | Valdes-Krieg et al. | 210/704 |
| 4,337,225 | 6/1982 | Dines | 210/638 |

FOREIGN PATENT DOCUMENTS

WO79/0025 1/1979 PCT Int'l Appl. .

OTHER PUBLICATIONS

A. R. Gupta, Separation and Science Technology, "Isotope Effects in Ion-Exchange Equilibria in Aqueous and Mixed Solvent Systems", vol. 14(9), pp. 843–857, 1979.

P. Somasundaran et al., Source Unknown, "Solution Chemistry of Surfactants and the Role of it in Adsorption and Froth Flotation in Mineral-Water Systems", pp. 777–788.

E. Valdes-Krieg, et al., Separation and Purification Methods, "Separation of Cations by Foam and Bubble Fractionation", vol. 6(2), pp. 221–285, 1977.

R. B. Grieves, et al., Recent Developments in Separation Science, "Foam Fractionation Selectivity Sequences of Quaternary Ammonium Surfactants for Simple and Complex Anions: A Review", pp. 55–65.

Robert Lemlich, "Adsorptive Bubble Separation Techniques", Academic Press, New York and London, 1972, pp. 1–5, 33–51, 62–63 and 133–143.

"Adsorptive Bubble Separation Processes", Chapter 14.2.

Primary Examiner—Brooks H. Hunt
Attorney, Agent, or Firm—Senniger, Powers, Leavitt and Roedel

[57] ABSTRACT

Process for separating isotopes of an element. A liquid feed mixture is prepared comprising an aqueous solvent and an ionic surfactant and containing two isotopes of a particular element and an ionizable compound that is present in the mixture. A gas is passed through a pool of the mixture to form bubbles therein, the surface of the bubbles having the surfactant thereon and one isotope of the element preferentially adsorbed thereto as a result of a chemical exchange between the surfactant and another component of the mixture. Thus, the concentration ratio of the isotopes at the bubble surface differs from that in the bulk of the pool. A top fraction is produced at the upper surface of the pool that is enriched in the one isotope as compared to the bulk of the pool. An overhead liquid fraction relatively enriched in the one isotope is collected from the top fraction.

21 Claims, 4 Drawing Figures

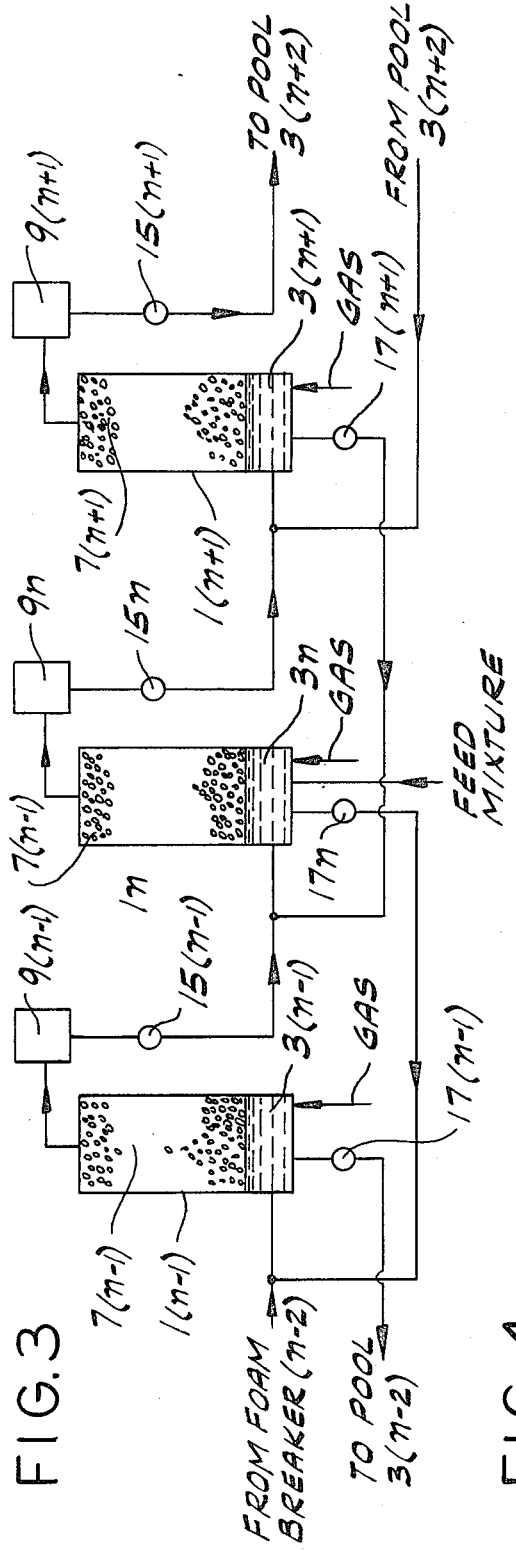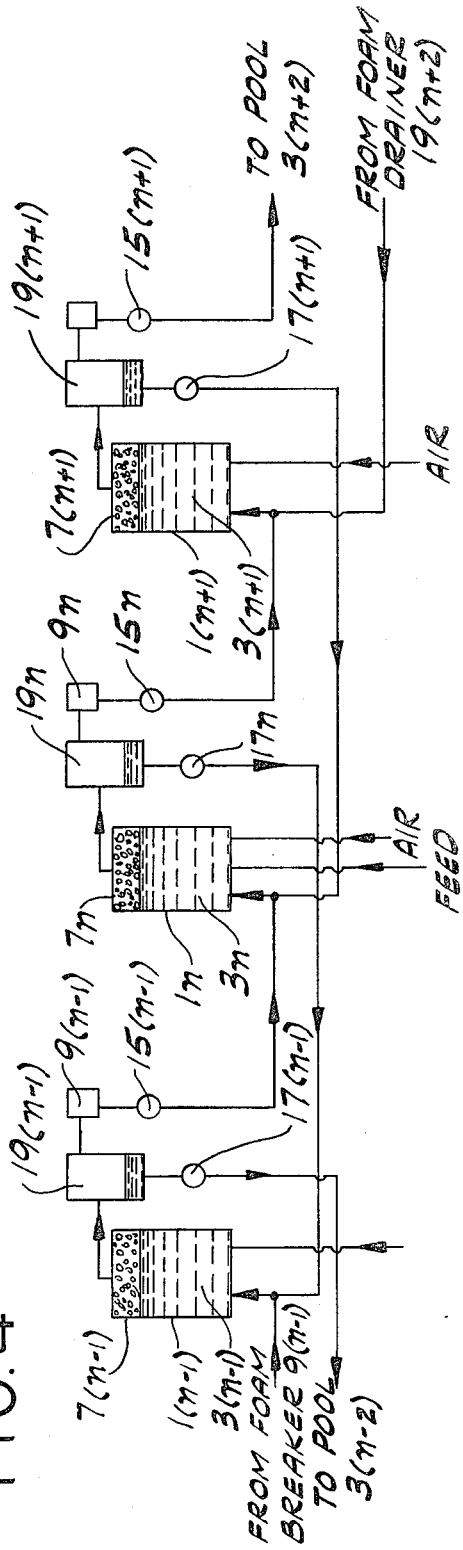

PROCESS FOR ISOTOPE SEPARATION

BACKGROUND OF THE INVENTION

This invention relates to the field of isotope separation and more particularly to novel methods for separation of isotopes by adsorptive bubble separation mechanisms.

Nuclides, representing isotopes of various elements, find extensive practical scientific, industrial and chemical applications. Thus, for example, carbon, nitrogen and oxygen are used as medical tracers. Sulfur is used as a tracer in environmental studies. Nitrogen is used in nuclear magnetic resonance probes. A large number of other applications are known to those skilled in the art.

A variety of methods are used in the art for separation of isotopes. These include distillation, chromatography, centrifugation (or other kinetic techniques), gaseous diffusion, and photoexcitation. All of these methods operate on the basis of small differences between isotopes or compounds containing them with respect to mass, volatility or other physical or chemical properties. As a result of the relatively small separation factors afforded by these differentials, conventional methods for isotope separation are typically characterized by high energy requirements, very large numbers of stages, the need for elaborate and specialized equipment, low thoughput, and the need for sophisticated control. As a consequence, operations are generally quite expensive and even minor process upsets can result in substantial penalties in productivity, yields and/or quality.

Attempts have been made in the art to devise methods for isotopic separation based on differences in the behavior of isotopes in chemical exchange reactions. According to Biegeleisen, "Separation of Isotopes," Newnes, London, 1961, four requirements must be met for a chemical exchange isotope separation scheme to be successful. First, the element whose isotopes are to be separated must be distributed between two phases in different chemical forms and there must be efficient contacting of the two phases in a countercurrent stream. Secondly, rapid chemical exchange must take place between the chemical forms. Thirdly, there must be an appreciable isotope effect, i.e. a combination of reaction and phase equilibria which results in a difference between the phases of the system with respect to concentration ratio of the isotopes. Fourth, there must be a means for separating the two chemical forms after exchange. Ion exchange isotope separation processes are illustrated by Gupta, "Isotope Effects in Ion Exchange Equilibria in Aqueous and Mixed Solvent Systems," *Separation Science and Technology*, 14(9) pages 843–857 (1979) which describes ion exchange techniques for isotope separation and particularly discusses the role of solvent fractionation effects in ion exchange equilibria in mixed solvents. However, the need for repetitive adsorption and desorption and the limited availability of exchange sites detracts from the commercial utility of ion exchange as a method for isotope separation.

DeWitt et al. U.S. Pat. No. 3,965,250 discloses a method for separating isotopes of sulfur contained in a sulfur dioxide feed gas by continuous reaction of the gas with potassium hydroxide to produce an acid sulfite solution, and liberation of sulfur 34-rich sulfur dioxide by reaction of the acid sulfite with sulfuric acid, thereby producing a potassium acid sulfate by-product. The potassium acid sulfate is neutralized and the resultant potassium sulfate solution is subjected to electrodialysis for regeneration of potassium hydroxide and sulfuric acid used respectively for adsorption of $SO_2$ and release of S-34 enriched sulfur dioxide gas. This process, which is relatively elaborate, requires a substantial energy input for operation of an electrodialysis unit, is relatively cumbersome and expensive to implement in an extensive cascade, and is limited to separation of isotopes of sulfur.

A need has remained in the art for relatively simplified methods of isotope separation which provide efficient enrichment without elaborate equipment or substantial energy expense.

SUMMARY OF THE INVENTION

Among the several objects of the present invention, therefore, may be noted the provision of a novel process for separation of isotopes of an element; the provision of such a process which is applicable to a wide variety of elements; the provision of such a process which is subject to simplified cascading; the provision of such a process which can be operated with relatively low energy input; the provision of such a process which can be implemented without the need for elaborate or highly specialized equipment; the provision of such a process which is subject to relatively straightforward control; the provision of such a process which is capable of achieving significant separation with a managable number of cascaded units; the provision of such a process which can be operated at moderate cost; and the provision of such a process which can be implemented with moderate capital investment.

Briefly, therefore, the present invention is directed to a process for separating isotopes of an element. In the process, a liquid feed mixture is prepared comprising an aqueous solvent and an ionic surfactant and containing two isotopes of a particular element in an ionizable compound that is present in the mixture. A gas is passed through a pool of the mixture to form bubbles therein. The surfaces of the bubbles have the surfactant thereon and one isotope of said element preferentially adsorbed thereto as a result of a chemical exchange between the surfactant and another component of the mixture. As a consequence, the concentration ratio of the isotopes at the bubble surfaces differs from that in the bulk of the pool. A top fraction is thereby produced at the upper surface of the pool that is enriched in the preferentially adsorbed isotope as compared to the bulk of the pool. From the top fraction, an overhead liquid fraction is collected which is relatively enriched in the preferentially adsorbed isotope.

Other objects and features will be part apparent and in part pointed out hereinafter.

BRIEF DESCRIPTION OF THE DRAWINGS

FIG. 3 is a schematic diagram showing a portion of a cascade of foam columns for carrying out the process of the invention; and FIG. 4 is a schematic diagram of a portion of a cascade comprising a modified foam fractionation system for carrying out the process of the invention.

Corresponding reference characters indicate corresponding parts in the several views of the drawings.

DESCRIPTION OF THE PREFERRED EMBODIMENTS

Figure 1:
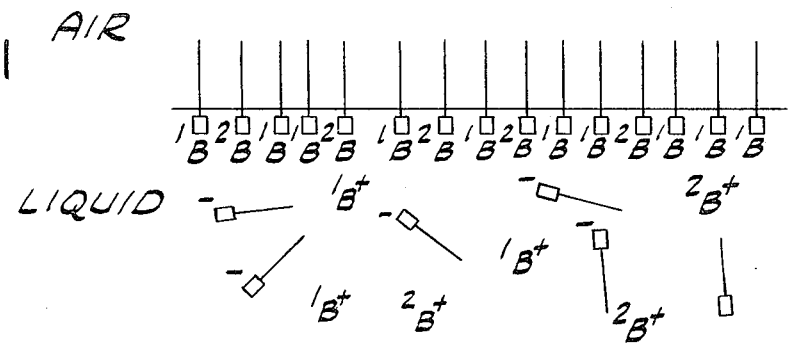
FIG. 1 is a schematic diagram of an adsorptive bubble separation system illustrating a difference between the bulk liquid pool and the gas/liquid interface (i.e. bubble surface) with respect to concentration ratio of isotopes.

In accordance with the present invention, it has been discovered that effective and efficient separation of isotopes of a variety of elements can be carried out by adsorptive bubble separation techniques. Either foam fractionation, bubble fractionation, or tandem bubble and foam fractionation systems can be effectively utilized in the process of the invention. Foam and/or bubble fractionation columns are conveniently arranged in cascades to achieve a high degree of separation of isotopes. Because of the high separation factors, a high degree of separation can be achieved with a number of cascaded columns that may compare favorably to the number of stages typically necessary for conventional isotope separation by distillation, diffusion or kinetic methods.

It will be understood by those skilled in the art that the method of invention is useful for enriching and concentrating isotopes and that in many practical applications complete quantitative isolation of one isotope from another may not be a practical necessity. Thus, the terms "separation" and "separating" are used herein in their accepted sense of enrichment by modification of the isotope concentration ratio and do not necessarily imply quantitative isolation. Whatever the degree of separation desired, the process of the invention provides an efficient means to achieve it.

In the process of the invention, a liquid feed mixture is prepared comprising an aqueous solvent and an ionic surfactant and containing a source of two or more isotopes of a given element. Typically, the solvent is simply water, but combinations of water and water-miscible polar organic solvents such as lower alcohols and dioxane may also be used. An ionic surfactant is necessary to effectuate the chemical exchange necessary for preferential adsorption of one isotope at the gas/liquid interface on the bubble surface. An ionizable compound present in the mixture serves as the source of the isotopes to be separated. In some circumstances, this source may be the surfactant. In other cases, the ionizable compound is another electrolyte that is present in the solution and contains a counterion which undergoes a chemical exchange with the surfactant to produce a species which is adsorbed on the bubble surface. If the isotopes of interest comprise or are contained in cations, anionic surfactants are used and if the isotopes are contained in anions, cationic surfactants are used. In certain instances, for example, where carbon isotopes are to be isolated, the isotopes of interest may be contained within the surfactant. In such instance, either anionic or cationic surfactants may be used.

Among the anionic surfactants which may be used are fatty carboxylic acids such as stearic and palmitic acid and the alkali metal salts thereof, alkali metal aliphatic sulfates and sulfonates, inorganic phosphate salts and alcohols. Useful cationic surfactants include quaternary ammonium and phosphonium halides, sulfates and hydroxides, as well as various basic organic amines.

The proportions of surfactant and counterion in the feed mixture are generally not critical. Preferred proportions of surfactant depend on the identity of the surfactant and the specific adsorptive bubble technique utilized. Thus, in the case of foam fractionation, it is, of course, essential to have enough surfactant to maintain a stable foam. Typically the feed mixture contains at least about 0.0001 moles/l. up to about 1.0 mole/l. surfactant. As to the counterion, it is typically present in a concentration range of between about $10^{-3}$ and about 1 moles/l. but may be well below $10^{-3}$ moles/l. for certain high value elements whose concentration in the source material is very low.

In order to promote the desired chemical exchange, a relatively high pH, i.e. at least about 9.0, is preferably maintained in the feed mixture to prevent interference by $H_3O^+$ ions where countercations are adsorbed using an anionic surfactant; and a relatively low pH, i.e. not more than about 5.0, is preferably maintained to prevent interference by $OH^-$ ions where the isotopes are contained in a counteranion that is adsorbed using a cationic surfactant. However, operations in such preferred pH ranges may not always be feasible as, for example, where the process utilizes a countercation such as magnesium which is precipitated at high pH.

Adsorptive bubble separation is effected by passing a gas through a pool of the liquid mixture. The gas should be essentially inert with respect to the components of the feed mixture. Typically, air or nitrogen may be used. To minimize evaporation of water from the system, the gas is conveniently prehumidified.

On passing of the gas through the feed mixture, bubbles are formed and a layer of surfactant collects at the gas/liquid interface on the bubble surfaces. Either as constituents of the surfactant itself, or by chemical exchange with another component (the solvent or other electrolyte) of the feed mixture, the isotopes of interest also become adsorbed on the bubble surfaces. As a result of differences in equilibria of the chemical exchange reaction between components containing one isotope of the element and those containing another isotope, one of the isotopes is preferentially adsorbed on the bubble surfaces. Because of the high concentration of surfactant at the bubble surface, the isotope for which the surfactant/counterion dissociation constant is lowest is that which is preferentially bound to the surfactant and adsorbed on the surface. Thus, for example, in the case of exchange between an anionic surfactant and a counter cation containing the isotopes of interest, the equilibria between each isotope and the surfactant can be summed to provide the net exchange reaction:

$$^1B^+ + {^2BS} \rightleftharpoons {^2B^+} + {^1BS} \tag{1}$$

Where $^1B+$ is a cation containing one isotope, $^2B+$ is a cation containing another isotope and the reaction moves preferentially to the right, i.e. the equilibrium constant (ratio of dissociation-constants) is greater than 1. The resultant condition at the gas/liquid interface is schematically illustrated in FIG. 1. In the case where the isotopes of interest are contained in the surfactant itself, preferential enrichment of one isotope at the bubble surface occurs as a result of either differences in the dissociation constant of the surfactant itself or differences in chemical equilibria with counterions as a function of the mass of the isotopes contained in the surfactant.

Although we do not wish to be held to any particular theory, it is understood that the effect of isotopes on chemical equilibria arises from differences in bond strength which in turn depend primarily on mass. While these effects are not nesessarily as large as kinetic isotope effects (as by centrifugation), they are at least of the same order of magnitude as distillation or gaseous diffusion isotope effects. As compiled by Biegeleisen, the following table gives comparisons of the approximate separation factors for three exemplary pairs of isotopes

| | Typical Separation Factors | | |
|---|---|---|---|
| Separation Method | H-D | $^{12}C-^{13}C$ | $^{235}U-^{238}U$ |
| Chem. Ex. | 3 | 1.02 | 1.001 |
| Dist. | 1.4 | 1.01 | 1.0000 |
| Gas Dif. | 1.2 | 1.03 | 1.004 |
| Centrifuge 250 m/sec | 1.01 | 1.01 | 1.026 |

As noted, the chemical equilibrium isotope effects increase with the differences in bonding between the two chemical forms. More particularly, the strong isotope effect of adsorptive bubble separation is attributable to significant differences in bonding between the counterion in solution and the counterion bound to the surfactant.

Where isotope separation is effected by bubble fractionation, passage of bubbles up through the liquid mixture results in concentration of one isotope in a layer at the upper surface of the liquid; while in foam fractionation that isotope is transported from the liquid by foam rising from the upper liquid surface. In either case the enriched fraction at the pool surface is referred to herein as the top fraction. In foam fractionation, an overheads fraction is collected by collapsing the foam at a location remote from the pool surface. In bubble fractionation, the enriched overhead fraction is collected by any of a variety of methods for removing material comprising all or part of the top fraction at the upper surface of the liquid. Such techniques may include skimming, as by use of a microtome, decantation, and collection by movement upwards through the liquid of a screen to which the enriched liquid from the upper layer adheres. By whatever means, an overhead liquid fraction is provided which is relatively enriched in the one isotope.

Figure 2:
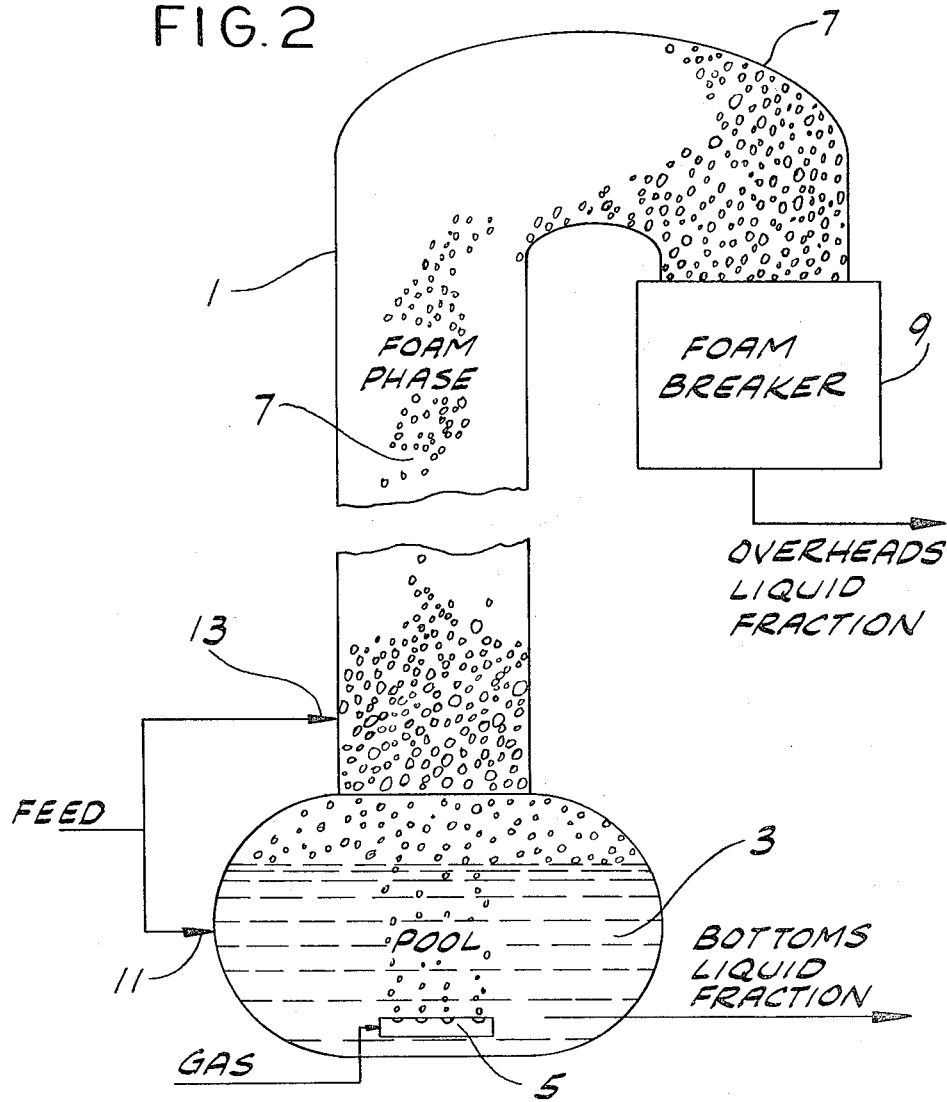
FIG. 2 is a schematic view of a foam fractionation column that can be used for implementation of the process of the invention.

Illustrated schematically in FIG. 2 is a typical system for separation of isotopes by foam fractionation. The system comprises a column 1 disposed over a pool 3 comprising the liquid mixture containing the isotopes to be separated. Gas is introduced into pool 3 through a sparger 5 creating bubbles which pass through the pool and form a foam phase 7 above the upper surface of pool 3. Foam moves upwardly through the column and then through a U-bend 7 into a foam breaker 9 where the foam is collapsed by a conventional technique such as mechanical compression, a high speed rotating disk, sonic energy, etc. A portion of the collapsed foam may be returned to the upper portion of the column as an external reflux. As the pool is depleted of the preferentially adsorbed isotope and enriched in the other isotope, a bottoms liquid fraction enriched in the other isotope is withdrawn. To replace material removed in the overhead and bottoms liquid fractions, the pool is replenished by addition of liquid feed mixture. Where enrichment of the overhead in one isotope is the primary objective, rectification in the column is maximized by delivering the feed at an inlet 11 below the upper surface of pool 3. Where a greater degree of stripping is desired in order to maximize enrichment of the bottoms fractions in the other isotope, the feed may be delivered at an inlet 13 located in the foam phase.

By allowing for drainage of excess liquid from the foam back into the pool, there is a reduction in the total surface area of the foam, an internal reflux is obtained, and effective rectification can be achieved involving more than one theoretical transfer unit in a single column. Using principles known to the art, height to diameter ratios may be adjusted to preserve essentially plug flow of foam and liquid drainage while providing sufficient cross-sectional area to permit production of the driest practicable foam leaving the top of the column. Mass velocities are not highly critical, but it has been discovered that liquid drainage and effective fractionation are enhanced if the bubbles contained in the foam formed immediately above the upper surface of the liquid pool have diameters in the range of between about 0.1 and about 0.5 mm and if the bubble diameter is allowed to grow to a size on the order of about 5 mm as the foam leaves the top of the column. For a typical column 2 cm in diameter, effective control of bubble size and efficient separation may be realized where gas is injected at a rate of approximately 1 l./hr. and foam rises at a rate of about 1 cm/min.

Temperature of operation is not narrowly critical but should be high enough that the viscosity of the liquid is sufficiently low to promote foam drainage. Within such viscosity limitation, relatively low temperatures are preferred because selectivity of chemical exchange reactions tends to decrease with temperature. For most systems, it has been discovered that these factors are suitably balanced at ambient temperatures. For this reason and to minimize energy requirements, operation at ambient is generally preferred.

The process of the invention is advantageously adapted for implementation in cascades of columns so that essentially quantitative separation of isotopes may be achieved. Thus the overhead liquid fraction from one stage is collected as a substantially non-expanded second liquid mixture and a gas is passed through a pool of the second liquid mixture in a second stage of the process to produce bubbles therein and a further adsorptive bubble separation takes place in a manner essentially identical to the operation of the first stage. At the upper surface of the second stage pool, a second stage top fraction is produced which is enriched as compared to the bulk of the second pool with respect to that isotope which comprises or is contained in the preferentially bound (non-dissociated) species. From the second stage top fraction a second stage overhead liquid fraction is collected which is relatively enriched in the preferentially adsorbed isotope as compared to the overhead liquid fraction coming from the first process stage.

In order to reach the degree of separation typically desired, the system further comprises a plurality of additional rectifying stages in each of which a gas is passed through a pool of a liquid mixture obtained by collecting the overhead liquid fraction from the prior stage and in each of which a further overhead liquid fraction is produced in the same manner as the liquid overhead fraction in the first two stages. Thus, the overhead liquid fraction is progressively enriched from stage to stage with respect to the proportion of the preferentially adsorbed isotope. Similarly, a plurality of stripping stages may be provided upstream of the first stage with respect to the flow of overhead liquid. In each of the stripping stages, gas is passed through a liquid pool and an overhead liquid fraction produced and fed downstream to the next succeeding stage in the same manner as in the rectifying stages. A bottom fraction is removed from the feed stage and recycled to the stripping stage immediately upstream thereof. In identical fashion, a bottom fraction is removed from each stripping stage and recycled to the prior stage immediately upstream so that the bottom fraction from the ultimate stripping stage may be removed as a product relatively denuded of the preferentially bound isotope and enriched with respect to the proportion of the isotope contained in the preferentially dissociated species.

Illustrated in FIGS. 3 and 4 are portions of cascades for carrying out the process of the invention. In the system of FIG. 3, overhead liquid fraction from foam breaker $9n$ associated with feed column $1n$ is delivered by an overheads pump $15n$ to pool $3(n+1)$ in column $1(n+1)$ of the second recifying stage. Prior to introduction into pool $3(n+1)$, the overhead liquid from the first stage is mixed with bottoms (or raffinate) returned from the third transferred by a bottoms pump $17n$ to the pool $3(n-1)$ of the first stripping stage $(n-1)$ after mixing with overheads from stripping stage $(n-2)$. The system of FIG. 4 is similar to that of FIG. 3 except that each stage has a foam drainer 19 interposed between column 1 and foam breaker 9, and raffinate from each stage is collected from the bottom of the foam drainer for transfer to the stage immediately upstream.

As noted, the process of the invention is applicable to the separation of a wide variety of isotopes. Thus, for example, carbon 12 and carbon 13 and nitrogen 14 and nitrogen 15 contained in a cyanide counterion can be separated using hexadecyltrimethylammonium bromide as the surfactant.

Sulfur-32, sulfur-33, sulfur-34, and sulfur-36 can be separated in a sulfide counterion using hexadecyltrimethylammonium bromide or other halide as a surfactant. In this separation, each isotope may be withdrawn from the cascade at a point where it concentrates as a result of its adsorbability relative to that of the other isotopes. Further purification may be achieved by removing side streams from appropriate locations in a principal cascade and isolating individual isotopes in parallel auxiliary cascades.

Chlorine-35 and chlorine-37 may be separated as a chloride ion using hexadecyltrimethylammonium chloride as a surfactant.

Lithium-6 and lithium-7 may be separated as a lithium counterion using sodium lauryl sulfate or sodium stearate as the surfactant. Because the lithium ions are highly hydrated in solution, there is a substantial difference between them with respect to binding to the surfactant and very efficient separations may be obtained.

Uranium-235 and uranium-238 may be separated in the $UO_2{}^{+2}$ counterion of a uranyl nitrate solution using sodium lauryl sulfate as the surfactant. Thorium isotopes may be separated using the same or similar anionic surfactants.

It has been discovered that the process of the invention is effective for separation of the isotopes of high atomic weight elements such as uranium and thorium, and that they provide a competitive commercial process for such purpose. Even greater separation factors are generally achieved with lower mass elements.

Because of the relative simplicity of foam and bubble fractionation systems, the process of the invention can be operated with straightforward control procedures and, because of the efficient separation, it is capable of making quantitative separations of isotopes with a significantly lesser number of cascaded units than are required in many other separation techniques. The use of a more readily managable number of cascaded units further facilitates control of the operation and minimizes the effect of process upsets. As a consequence of these factors, the low energy requirements and the lack of need for elaborate or specialized equipment, the process of the invention can be operated at moderate cost and facilities for the operation thereof can be installed at relatively modest capital cost.

The following examples illustrate the invention:

EXAMPLE 1

A liquid feed mixture was prepared by mixing water (2 l) hexadecyltrimethylammonium chloride (6.40 g) and sodium chloride (1.16 g). This solution was charged to a foam fractionator having a cylindrical column 20 mm in diameter and 2 m high. Prehumidified nitrogen gas was bubbled through the pool in the fractionator at an initial rate of 5 l./hr. After about three hours, the nitrogen flow rate was decreased to about 1 l./hr. and several hours later adjusted to 1.5 l./hr. After 48 hours, gas introduction was terminated and samples taken of both the raffinate remaining in the pool and the overhead liquids fraction obtained by collecting the collapsed foam. Each of the samples was dried and re-dissolved in water (6 ml). Hot lead nitrate solution (3 ml) was added to each sample solution to precipitate the chloride. The lead chloride precipitate was recovered by centrifugation, washed with cold water (1 ml) and twice with acetone (5 ml aliquots).

To determine the relative proportions of chlorine-35 and chlorine-37, both the raffinate and foamate samples were analyzed by mass spectrometry. Two runs were made on the mass spectrometer. Results are set forth in Table I.

TABLE I

| Mass Spectro meter Run | Atomic Ratio $^{35}Cl$ to $^{37}Cl$ | | Separation Factor |
|---|---|---|---|
| | Raffinate | Foamate | |
| I | 3.16 ± 0.07 | 3.10 ± 0.07 | 1.019 |
| II | 3.09 ± 0.05 | 3.05 ± 0.05 | 1.013 |

EXAMPLE 2

A feed mixture was prepared by dissolving $UO_2(NO_3)_2.6H2O$ (21 g) in water (1 l.) and adding a $9.98 \times 10^{-2}$ molar sodium lauryl sulfate solution (30 ml). This solution was placed in a foam fractionator of the type described in Example 1 and pre-humidified nitrogren gas bubbled through the pool. A 50 ml sample was taken and labeled "201". Raffinate and foamate samples were taken after 2.5 hours and labeled "202" and "203" respectively. At that time, an additional amount of 0.0998 molar sodium lauryl sulfate solution (20 ml) was added to the pool to improve the effectiveness of foaming. The gas introduction was continued and samples taken at 13.9 hours and 41.7 hours. At 44.0 hours additional samples were taken and a further amount of 0.1 molar sodium lauryl sulfate solution (20 ml) was added to the pool. The foamate sample taken at 44.0 hours contained a gray precipitate which dissolved after gentle heating.

Additional samples were taken at 76.4 hours. At 90.3 hours, additional amounts of water (250 ml) and 0.1 molar sodium lauryl sulfate solution (20 ml) were added. Further samples were taken at 96.7 hours. At 121.1 hours, a precipitate was observed in the foam fraction. Additional samples were taken at 136.0 hours, at which time foam generation had essentially ceased. An additional amount at 0.1 molar sodium lauryl sulfate solution (20 ml) was added at this point, and the same amount again added at 158.9 hours. At 183.3 hours, 0.1 molar sodium lauryl sulfate solution (20 ml) and water (80 ml) were added to the pool. Samples were taken at 184.9 hours and 20 ml portions of 0.1 molar sodium lauryl sulfate solution were added at 207.8 hours, 229.2 hours, and 255.6 hours. At 263.9 hours, the final samples were taken with the raffinate sample labeled "216" and the foamate sample labeled "217".

Both samples "202" and "216" were analyzed by mass spectrometry to determine the relative proportions therein of uranium-235 and uranium-238. In sample 202 the ratio of U-238 to U-235 was found to be 138.42±0.28 and in sample 216 the ratio was found to be 137.90±0.28 thereby reflecting an enrichment factor of 1.0038 for U-235 in the raffinate. Data from this example were highly consistent and reliable.

EXAMPLE 3

A feed mixture was prepared by dissolving ammonium chloride (2 g) and sodium lauryl sulfate (3 g) in water ( 2 l). A 200 ml. aliquot of this solution was reserved and labeled "feed". The remainder was placed in a foam fractionator of the type described in Example 1 and prehumidified nitrogen gas bubbled continuously through the pool at an initial rate sufficient to generate a foam rising at 10.7 cm/minute in the fractionator column.

After 27 hours, the foam collector was changed and a 200 ml. aliquot of raffinate removed. Two samples of foamate were taken in vials labeled 12 and 13 and two samples of raffinate taken in vials labeled 20 and 21. The nitrogen flow rate was adjusted so that the rate of foam rise in the column was 6.5 cm/minute.

At 52 hours after the commencement of foam operation, the nitrogen flow rate was adjusted so that the foam rose at a rate of 8.2 cm/minute. At 72 hours, additional foamate samples were taken in vials identified as 14 and 15 and additional raffinate samples were taken in vials identified as 22 and 23.

At 95 hours, additional samples of foamate were taken in vials labeled 16, 17, 18, and 19 and additional raffinate samples were taken in vials identified as 24 and 25. After 127 hours, additional raffinate samples were taken in vials labeled 26 and 27.

The samples were evaporated and surfactant precipitated by addition of calcium chloride. The precipitate was removed by filtration and the filtrate placed in a steam distillation apparatus, sodium hydroxide added, distillation carried out, and the distillate captured in sulfuric acid solution. The foamate samples and raffinate samples were treated in the same manner, with ethyl alcohol being removed by evaporation of the foamate. All samples were thereafter subjected to analysis by mass spectroscopy to determine the proportion of nitrogen-15 therein. Differences between the foamate and raffinate samples were indicative of enrichment of the foamate in nitrogen-15 vs. nitrogen-14. Certain of the mass spectrometric analytical results were disregarded as unreliable where final pressure was excessively low (below 6 torr). Set forth in Table II are the results of the mass spectrometric analysis for those analytical runs considered reliable.

TABLE II

| Time | Sample No. | N—15 Content Feed | Raffinate | Foam |
|---|---|---|---|---|
| 0 | 10 | 0.3654% | | |
| " | 11 | 0.3696% | | |
| 27 hr. | 20 | | * | |
| " | 21 | | 0.3700% | |
| " | 12 | | | * |
| " | 13 | | | * |
| 72 hr. | 22 | | 0.3654 | |
| " | 23 | | 0.3702 | |
| " | 14 | | | 0.3695% |
| " | 15 | | | 0.3734 |
| 95 hr. | 24 | | 0.3707 | |
| " | 25 | | * | |
| " | 16 | | | 0.3730 |
| " | 17 | | | 0.3725 |
| 127 hr. | 26 | | 0.3707 | |
| " | 27 | | 0.3687 | |
| 95 hr. | 18 | | | * |
| " | 19 | | | 0.3714 |

*Analysis failed.

From these results it was determined that the nitrogen-15 content of the feed and raffinate averaged 0.3688±0.0022% while the nitrogen 15 content of the foamate averaged 0.3720±0.0016%. From these data, the separation factor was determined to be approximately 1.009.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

We claim:

1. A process for separating isotopes of an element comprising the steps of:
    preparing a liquid feed mixture comprising an aqueous solvent and an ionic surfactant and containing two isotopes of a particular element in an ionizable compound that is present in the mixture;
    passing a gas through a pool of said mixture to form bubbles therein, the surfaces of said bubbles having said surfactant thereon and one isotope of said element preferentially adsorbed thereto as a result of a chemical exchange between said surfactant and another component of said mixture, so that the concentration ratio of said isotopes at said bubble surfaces differs from that in the bulk of said pool, producing at the upper surface of said pool a top fraction comprising a foam that is enriched in said one isotope as compared to the bulk of said pool;
    moving said foam vertically through a column above said upper surface and permitting the bubble size thereof to increase, thereby effecting drainage of liquid from said foam to provide an internal reflux and rectification within said column; and
    collapsing said foam to form an overhead liquid fraction relatively enriched in said one isotope.

2. A process as set forth in claim 1 wherein a foam having a bubble diameter of between about 0.1 and about 0.5 mm is formed immediately above said upper surface.

3. A process as set forth in claim 1 wherein as said bubbles move vertically through said column they increase in size to a diameter on the order of about 5 mm in said column.

4. A process as set forth in claim 1 wherein a substantially constant liquid level is maintained for said pool by replenishment thereof from a feedstream of said liquid mixture.

5. A process as set forth in claim 1 wherein said feed in injected into said column above said upper surface thereby effecting stripping within said foam and producing a bottoms fractions that is relatively depleted with respect to said one isotope of said element.

6. A process as set forth in claim 1 wherein said isotopes are contained in counterions whose charge is opposite from that of said surfactant.

7. A process as set forth in claim 6 wherein said surfactant is anionic and said isotopes are contained in counter-cations.

8. A process as set forth in claim 7 wherein the pH of said feed mixture is maintained at at least about 9.0.

9. A process as set forth in claim 7 wherein said isotopes comprise lithium-6 and lithium-7 and said surfactant is selected from the group consisting of alkali metal lauryl sulfate and alkali metal stearate.

10. A process as set forth in claim 7 wherein said isotopes comprise uranium-235 and uranium-238, said counterion comprises $UO_2^{+2}$ and said surfactant comprises sodium lauryl sulfate.

11. A process as set forth in claim 6 wherein said surfactant is cationic and said isotopes are contained in counter-anions.

12. A process as set forth in claim 11 wherein the pH of said liquid feed mixture is maintained at no more than about 5.0.

13. A process as set forth in claim 11 wherein said two isotopes are selected from the group consisting of carbon-12 and 13 and nitrogen-14 and 15, said counterion comprises cyanide ion and said surfactant comprises a hexadecyltrimethylammonium halide.

14. A process as set forth in claim 11 wherein said isotopes comprise sulfur-32, sulfur-33, sulfur-34, and sulfur-36, said counterion comprises sulfide, and said surfactant comprises a hexadecyltrimethylammonium salt.

15. A process as set forth in claim 11 wherein said isotopes comprise chlorine-35 and chlorine-37, said counterion comprise chloride and said surfactant comprises hexadecyltrimethylammonium chloride.

16. A process as set forth in claim 1 wherein said isotopes are contained in said surfactant.

17. A process as set forth in claim 16 wherein said isotopes comprise carbon-12 and carbon-13.

18. A process as set forth in claim 1 further comprising
collecting said overhead liquid fraction as a substantially non-expanded second liquid mixture;
passing a gas through a pool of said second liquid mixture in a second stage of said process to produce bubbles therein at the surfaces of which said one isotope is preferentially adsorbed so that the concentration ratio of said isotopes at said bubble surfaces differs from that in the bulk of said second pool, thereby producing a second stage top fraction at the upper surface of said second pool which is enriched in said one isotope as compared to the bulk of said second pool; and
collecting from said second stage top fraction a second stage overhead liquid fraction relatively enriched in said one isotope as compared to the overhead liquid fraction from the first process stage.

19. A process as set forth in claim 18 further comprising a plurality of additional rectifying stages in each of which a gas is passed through a pool comprising a liquid mixture obtained by collecting the overhead liquid fraction from the prior stage and a further overhead liquid fraction is produced in the same manner as the liquid overhead fraction of the first two stages, the overhead liquid fraction being progressively enriched from stage to stage with respect to the proportion of the said one isotope.

20. A process as set forth in claim 19 wherein a bottoms fractions that is relatively depleted with respect to said one isotope is removed from each of the second and subsequent stages and recycled to the stage immediately prior thereto.

21. A process for separating isotopes of an element comprising the steps of:
preparing a liquid feed mixture by mixing water, an ionic surfactant and another ionizable compound containing two isotopes of a particular element;
passing a gas through a pool of said mixture to form bubbles therein, the surfaces of said bubbles having said surfactant thereon and one isotope of said element preferentially adsorbed thereto, so that the concentration ratio of said isotopes at said bubble surfaces differs from that in the bulk of said pool, producing a top fraction at the upper surface of said pool that is enriched in said one isotope as compared to the bulk of said pool;
collecting from said top fraction an overhead liquid fraction relatively enriched in said one isotope.

* * * * *